(12) United States Patent
Tomizawa et al.

(10) Patent No.: US 10,857,652 B2
(45) Date of Patent: Dec. 8, 2020

(54) ELECTROPLATED TOOL, SCREW-SHAPED GRINDSTONE FOR GRINDING GEAR, METHOD FOR MANUFACTURING ELECTROPLATED TOOL, AND METHOD FOR MANUFACTURING SCREW-SHAPED GRINDSTONE FOR GRINDING GEAR

(71) Applicant: HONDA MOTOR CO., LTD., Tokyo (JP)

(72) Inventors: Yuichi Tomizawa, Tochigi (JP); Yu Kubodera, Tochigi (JP); Daisuke Koshino, Tochigi (JP); Shogo Nagayoshi, Tochigi (JP); Takahiro Otsuka, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 411 days.

(21) Appl. No.: 15/745,209

(22) PCT Filed: Jul. 15, 2016

(86) PCT No.: PCT/JP2016/071038
§ 371 (c)(1),
(2) Date: Jan. 16, 2018

(87) PCT Pub. No.: WO2017/014197
PCT Pub. Date: Jan. 26, 2017

(65) Prior Publication Data
US 2019/0015951 A1    Jan. 17, 2019

(30) Foreign Application Priority Data

Jul. 17, 2015 (JP) .................................. 2015-142957
Jul. 17, 2015 (JP) .................................. 2015-142958

(51) Int. Cl.
*B24D 3/10* (2006.01)
*B23F 21/02* (2006.01)
(Continued)

(52) U.S. Cl.
CPC ................ *B24D 3/10* (2013.01); *B23F 21/02* (2013.01); *B23F 21/026* (2013.01);
(Continued)

(58) Field of Classification Search
None
See application file for complete search history.

(56) References Cited

U.S. PATENT DOCUMENTS 4,411,107 A * 10/1983 Sekiya .................... B24D 7/02
451/450
5,759,455 A * 6/1998 Kamitakahara ....... B29C 43/222
264/1.34
(Continued)

FOREIGN PATENT DOCUMENTS

CN    201083958    7/2008
DE    196 43 113 A1    4/1998
(Continued)

OTHER PUBLICATIONS

International Search Report, dated Aug. 16, 2016 (Aug. 16, 2016), 3 pages.
Chinese Office Action dated Sep. 12, 2018, 10 pages.

*Primary Examiner* — Colleen P Dunn
*Assistant Examiner* — Ross J Christie
(74) *Attorney, Agent, or Firm* — Rankin, Hill & Clark LLP

(57) ABSTRACT

Provided are: an electroplated tool; a screw-shaped grindstone for grinding a gear; a method for manufacturing the electroplated tool; and a method for manufacturing the crew-shaped grindstone for grinding a gear. Said tool having (Continued)

a parent material, a plating layer that has a high-level portion and a low-level portion formed as strips on the parent material at different heights along the direction intersecting the processing direction, and electrodeposited abrasive grains exposed from the surface of the plating layer. The difference in height of the plating layer is preferably 50-100% of the average particle diameter of the abrasive grains, the width of the high-level portion of the plating layer is preferably 150-200% of the average particle diameter of the abrasive grains, and the width of the low-level portion of the plating layer is preferably 100-800% of the average particle diameter of the abrasive grains.

21 Claims, 8 Drawing Sheets

(51) Int. Cl.
*B24D 7/18* (2006.01)
*B24D 3/00* (2006.01)
*B24D 3/06* (2006.01)
*B24B 19/00* (2006.01)
*B24D 5/06* (2006.01)
*B24D 18/00* (2006.01)
*C09K 3/14* (2006.01)

(52) U.S. Cl.
CPC .............. *B24B 19/009* (2013.01); *B24D 3/00* (2013.01); *B24D 3/06* (2013.01); *B24D 5/06* (2013.01); *B24D 7/18* (2013.01); *B24D 18/0018* (2013.01); *C09K 3/1409* (2013.01); *C04B 2235/427* (2013.01)

(56) References Cited

U.S. PATENT DOCUMENTS

| 5,989,405 | A | * | 11/1999 | Murata | B24B 53/017 205/110 |
| 6,312,324 | B1 | * | 11/2001 | Mitsui | B24B 3/06 451/540 |
| 7,713,683 | B2 | * | 5/2010 | Gray | B23K 26/361 430/322 |
| 8,057,729 | B2 | * | 11/2011 | Stone | A61F 13/512 264/400 |
| 2001/0014578 | A1 | * | 8/2001 | Takahashi | B24D 3/06 451/548 |
| 2002/0160696 | A1 | * | 10/2002 | Shimizu | B08B 1/04 451/41 |
| 2012/0184187 | A1 | * | 7/2012 | Yanase | B24B 53/085 451/47 |

FOREIGN PATENT DOCUMENTS

| GB | 2 113 584 A | | 8/1983 | |
| JP | 58-132418 | | 8/1983 | |
| JP | 62-057816 | | 3/1987 | |
| JP | S64-20253 | | 2/1989 | |
| JP | 09-193023 | | 7/1997 | |
| JP | 10-193269 | | 7/1998 | |
| JP | 2007-038317 | | 2/2007 | |
| JP | 2011189434 A | * | 9/2011 | ............ B23F 21/026 |

* cited by examiner

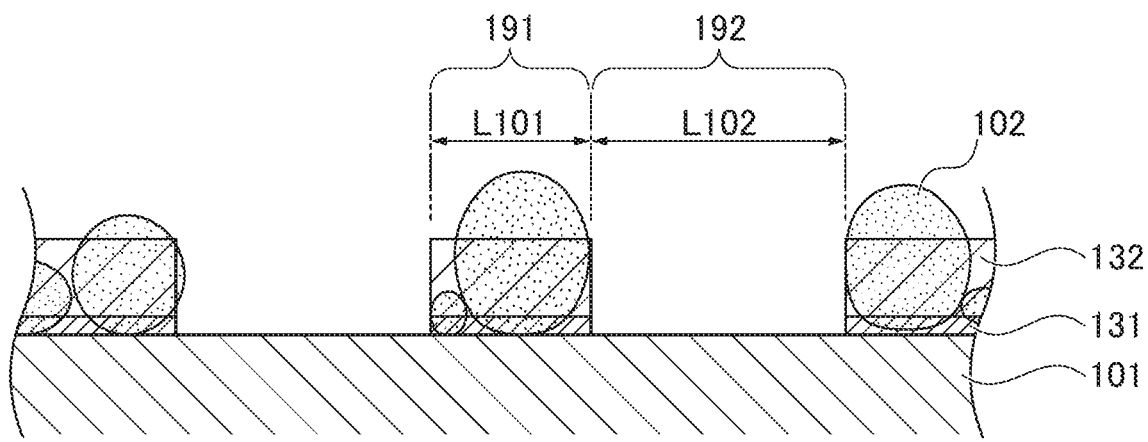
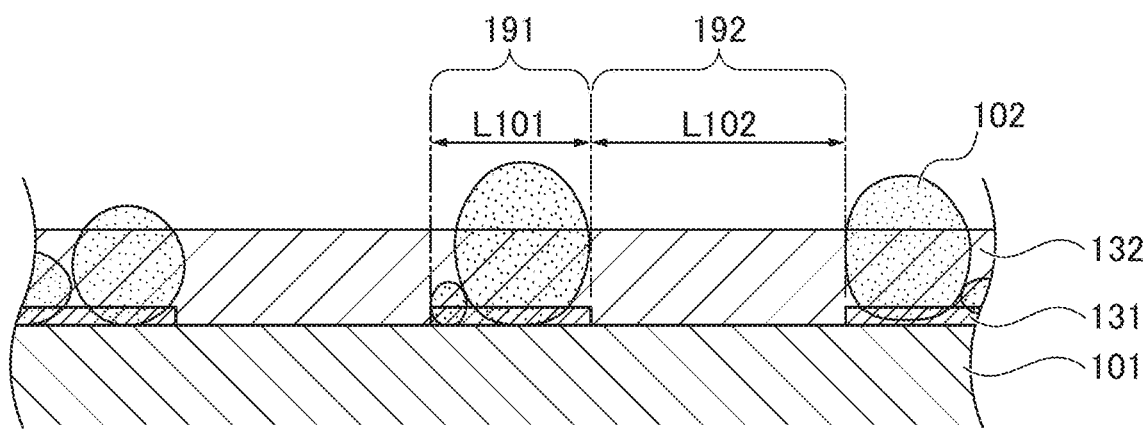

ELECTROPLATED TOOL, SCREW-SHAPED GRINDSTONE FOR GRINDING GEAR, METHOD FOR MANUFACTURING ELECTROPLATED TOOL, AND METHOD FOR MANUFACTURING SCREW-SHAPED GRINDSTONE FOR GRINDING GEAR

TECHNICAL FIELD

The present invention relates to an electroplated tool, a screw-shaped grindstone for grinding a gear, a method for manufacturing an electroplated tool, and a method for manufacturing a screw-shaped grindstone for grinding a gear.

BACKGROUND ART

An electroplated tool is a tool provided with various abrasive grains on a surface of a parent material by electroplating. Electroplated tools are widely used for grinding because the abrasive grains are less likely to fall off due to the high strength of an electroplated plating layer and highly efficient grinding is possible.

As the electroplated tool, a screw-shaped grindstone for grinding a gear is known, for example. The screw-shaped grindstone for grinding a gear grinds a tooth surface of a gear with a grinding surface of the screw-shaped grindstone by rotating the gear and the screw-shaped grindstone in a meshed state with each other.

Incidentally, in the case of grinding various materials with the electroplated tool, the area ratio of the abrasive grain electroplating amount and a chip pocket (a portion where abrasive grains to act are not electroplated) substantially influences the lifetime of the electroplated tool and processing efficiency. If the abrasive grain electroplating amount is too large, clogging and welding occur, and the grade of the processed surface decreases. Further, grinding resistance increases, and the processing may not be able to continue. Further, in the case of the above-described screw-shaped grindstone for grinding a gear, the screw-shaped grindstone for grinding a gear has a complex shape, and thus especially, chips are difficult to be discharged, clogging and welding occur, and the grade of the processed surface decreases.

As a countermeasure for the above problem, a method for forming a level difference in the parent material to cause a low-level portion to function as a chip pocket, and only using abrasive grains electroplated on a high-level portion for grinding is known. For example, a technology for applying a masking using a masking sheet or the like on a part of the parent material, and forming a plating layer on the non-masked portion, to provide a level difference in the parent material is known (see Patent Document 1).

Further, in the case of a screw-shaped grindstone for grinding a gear, a method for controlling the abrasive grain fixing amount to provide a chip pocket is known. For example, a method for providing at least two abrasive grain bands in a radial direction on a slope of a screw-shaped grindstone, the abrasive grain bands being inclined by 10 degrees or more with respect to the radial direction, is known (see Patent Document 2).

Patent Document 1: Japanese Unexamined Patent Application, Publication No. H09-193023
Patent Document 2: Japanese Unexamined Patent Application, Publication No. S62-057816

DISCLOSURE OF THE INVENTION

Problems to be Solved by the Invention

However, in the electroplated tool obtained by the technology of Patent Document 1, only the area ratio of the high-level portion and the low-level portion being 3:7 to 7:3 is defined, and portions where a gap between the abrasive grains is not guaranteed may continuously exist. Therefore, there is a problem of occurrence of clogging by chips in these portions. Further, if the gap between the abrasive grains is simply enlarged, there are problems that an unprocessed portion occurs, and processing accuracy deteriorates.

Further, in the screw-shaped grindstone for grinding a gear obtained by the technology of Patent Document 2, at least two abrasive grain bands exist in the radial direction. Therefore, there is a problem that, when the chips generated inside in the grindstone radial direction are discharged to an outside in the grindstone radial direction by centrifugal force, the chips get caught in the abrasive grain belt outside in the grindstone radial direction, and thus discharge of the chips is hindered.

The present invention has been made in view of the foregoing, and an objective of the present invention is to provide an electroplated tool, a screw-shaped grindstone for grinding a gear, a method for manufacturing an electroplated tool, and a method for manufacturing a screw-shaped grindstone for grinding a gear, having excellent chip discharge capacity and processing accuracy, and enabling highly efficient grinding.

Means for Solving the Problems (1) To achieve the above objective, the present invention provides an electroplated tool (an electroplated tool 7 described below, for example) including a parent material (a parent material 1 described below, for example), a plating layer (a first plating layer 31, a second plating layer 32, and a third plating layer 33 described below, for example) formed provided with a difference in height in a stripe manner on the parent material in a direction intersecting a processing direction, and having a high-level portion (a high-level portion 91 described below, for example) and a low-level portion (a low-level portion 92 described below, for example), and abrasive grains (abrasive grains 2 described below, for example) provided by electroplating, and exposed on a surface of the plating layer.

The electroplated tool of (1) is arranged with the difference in height in a stripe manner in a direction in which the abrasive grains intersect the processing direction of the tool. Therefore, chips generated at the time of grinding with the high-level portion formed in a stripe manner are efficiently discharged from the adjacent low-level portion, and thus excellent chip discharge capacity is obtained. Therefore, clogging can be suppressed, and highly efficient grinding becomes possible. Further, even when the position and the angle of a line of action (an aggregate of points at which the abrasive grains actually come into contact with a work piece) of the tool are changed at the time of processing, the abrasive grains formed in a stripe manner in the direction intersecting the processing direction of the electroplated tool are included. Therefore, the interval and the number of the abrasive grains that contribute to the processing become constant. As a result, excellent processing accuracy is obtained.

(2) In the invention of (1), the difference in height of the plating layer (the plating layer 31 described below, for example) is favorably 50 to 100% of an average particle diameter of the abrasive grains (the abrasive grains 2 described below, for example).

In the electroplated tool of (2), the difference in height of the plating layer is 50 to 100% of the average particle diameter of the abrasive grains, and thus apex portions of the abrasive grains electroplated in the high-level portion of the plating layer protrude and are positioned at the highest point. Here, in the electroplated tool of Patent Document 1, the height of the level difference on the parent material is 5 to 30% of the average particle diameter of the abrasive grains. Therefore, when the grinding amount per unit time of the grindstone is increased to increase the chip discharge amount, the chips get caught with the abrasive grains on the low-level portion, and the dischargeability of the chips is decreased. In contrast, in the electroplated tool of (2), the apex portions of the abrasive grains electroplated in the high-level portion reliably protrude, and the abrasive grains existing on the low-level portion do not hinder chip discharge. Therefore, according to the electroplated tool of (2), excellent chip discharge capacity is obtained, and highly efficient grinding becomes possible.

(3) In the invention of (1) or (2), a width of the high-level portion (a width L1 of the high-level portion described below, for example) of the plating layer (the plating layer 31 described below, for example) is favorably 150 to 200% of an average particle diameter of the abrasive grains (the abrasive grains 2 described below, for example).

In the electroplated tool of (3), the width of the high-level portion of the plating layer is 150 to 200% of the average particle diameter of the abrasive grains, and thus the average number of the electroplated abrasive grains in a width direction of the abrasive grains is two or less in the high-level portion of the plating layer provided in a stripe manner. Therefore, the abrasive grains have a portion not in contact with another abrasive grain, and thus the chips can be reliably discharged through the portion. Therefore, according to the electroplated tool of (3), excellent chip discharge capacity is obtained, clogging can be suppressed, and highly efficient grinding becomes possible.

Further, in the electroplated tool of (3), the average number of the abrasive grains in the width direction of the electroplated abrasive grains is one or more in the high-level portion of the plating layer. Therefore, an average of one abrasive grain protrudes in the width direction of the high-level portion, and thus the processing accuracy is guaranteed.

(4) In the invention of any one of (1) to (3), a width of the low-level portion (a width L2 of the low-level portion described below, for example) of the plating layer (the plating layer 32, for example) is favorably 100% or more of an average particle diameter of the abrasive grains (the abrasive grains 2 described below, for example).

In the electroplated tool of (4), the width of the low-level portion of the plating layer is wider than the average particle diameter of the abrasive grains, and thus a gap for discharging the chips can be reliably provided in the low-level portion. Therefore, according to the electroplated tool of (4), excellent chip discharge capacity is obtained, clogging can be suppressed, and highly efficient grinding becomes possible.

(5) The invention of any one of (1) to (4) can be favorably used as a screw-shaped grindstone for grinding a gear.

The screw-shaped grindstone for grinding a gear has a complex shape, and thus typically discharge of the chips is difficult, whereas according to the invention of (5), the electroplated tool of any one of (1) to (4) having excellent chip discharge capacity is applied to the screw-shaped grindstone for grinding a gear, whereby the screw-shaped grindstone for grinding a gear remarkably exhibits the above-described effect.

(6) To achieve the above objective, the present invention provides a screw-shaped grindstone for grinding a gear including a parent material (a parent material 101 described below, for example), and an abrasive grain portion (an abrasive grain portion 191 described below, for example) formed on the parent material in a stripe manner in a direction perpendicular to a processing direction, and including abrasive grains (abrasive grains 102 described below, for example).

In the screw-shaped grindstone for grinding a gear of (6), the abrasive grain portion to which the abrasive grains are fixed is arranged on the parent material in a stripe manner in the direction perpendicular to the processing direction of the tool. Therefore, when the chips generated inside in a grindstone radial direction are discharged toward outside in a grindstone radial direction by centrifugal force, the chips are efficiently discharged through a gap between the adjacent abrasive grains without being caught in the abrasive grain portion outside in the grindstone radial direction. Therefore, excellent chip discharge capacity can be obtained, and clogging can be suppressed. Further, since the abrasive grain portion is arranged in a stripe manner in the direction perpendicular to the processing direction, the interval and the number of the abrasive grains involved in grinding fall within a constant range, and thus the processing accuracy is also guaranteed.

(7) In the invention of (6), a width of the abrasive grain portion (a width L101 of the abrasive grain portion described below, for example) is favorably 150 to 200% of an average particle diameter of the abrasive grains (the abrasive grains 102 described below, for example).

In the screw-shaped grindstone for grinding a gear of (7), the width of the abrasive grain portion is 150 to 200% of the average particle diameter of the abrasive grains, and thus an average number of the abrasive grains in the width direction of the abrasive grains fixed to the abrasive grain portion formed in a stripe manner is two or less. Therefore, a portion not in contact with another abrasive grain is created in the abrasive grains, and thus the chips can be easily discharged through the portion. Therefore, excellent chip discharge capacity is obtained, clogging can be suppressed, and highly efficient grinding becomes possible.

Further, in the screw-shaped grindstone for grinding a gear of (7), the average number of the abrasive grains in the width direction of the abrasive grains fixed to the abrasive grain portion formed in a stipe manner is one or more. Therefore, an average of one abrasive grain protrudes in the width direction of the abrasive grain portion, and thus the processing accuracy is guaranteed.

(8) In the invention of (6) or (7), an interval between the adjacent abrasive grain portions (an interval L102 between the abrasive grain portions described below, for example) is favorably 100 to 800% of an average particle diameter of the abrasive grains (the abrasive grains 102 described below, for example).

In the screw-shaped grindstone for grinding a gear of (8), the interval between the abrasive grain portions (hereinafter, referred to as "low-level portion") is larger than the average particle diameter of the abrasive grains, and thus a gap for discharging the chips can be reliably provided in the interval of the abrasive grain portions, and excellent chip discharge capacity is obtained and clogging is less likely to occur. Therefore, highly efficient grinding becomes possible.

(9) Provided is a method for manufacturing an electroplated tool, the method including a masking process for forming a masking on a parent material in a stripe manner in a direction intersecting a processing direction, a first plating process for forming a plating layer on the parent material on which the masking has been formed, an electroplating process for electroplating abrasive grains after removing the masking from the parent material on which the plating layer has been formed, and a second plating process for forming a plating layer on the parent material on which the abrasive grains have been electroplated.

According to the invention of (9), the above-described electroplated tool can be reliably manufactured. Further, a dot discharge application method such as a jet dispenser can be employed to form the masking in a stripe manner. Therefore, a masking with high accuracy can be applied at a high speed.

(10) In the invention of (9), the first plating process favorably causes a thickness of the plating layer (a plating layer 31 described below, for example) to be 50 to 100% of an average particle diameter of the abrasive grains (the abrasive grains 2 described below, for example).

According to the method for manufacturing an electroplated tool of (10), the electroplated tool of (2) can be reliably manufactured.

(11) In the invention of (9) or (10), the masking process favorably causes a width between the adjacent maskings (a masking 5 described below, for example) to be 150 to 200% of an average particle diameter of the abrasive grains (the abrasive grains 2 described below, for example).

According to the method for manufacturing an electroplated tool of (11), the electroplated tool of (3) can be reliably manufactured.

(12) In the invention of any one of (9) to (11), the masking process favorably causes a width of the masking (the masking 5 described below, for example) to be 100% or more of an average particle diameter of the abrasive grains (the abrasive grains 2 described below, for example).

According to the method for manufacturing an electroplated tool of (12), the electroplated tool of (4) can be reliably manufactured.

(13) In the invention of any one of (9) to (12), the masking process favorably applies, using an application device (a dispenser 6 described below, for example), a masking agent to form the masking (the masking 5 described below, for example) while moving a nozzle of the application device to follow a shape of the parent material (the parent material 1 described below, for example) such that a distance between a tip of the nozzle of the application device and an application surface of the parent material becomes approximately constant.

According to the invention of (13), the distance between the application surface and the tip of the nozzle is kept approximately constant, and thus the masking can be accurately formed and the electroplated tool according to the present invention can be reliably manufactured even when manufacturing an electroplate tool having a complex shape like a screw-shaped grindstone for grinding a gear.

(14) In the invention of (13), the masking process favorably applies the masking agent to form the masking while changing a moving speed of the nozzle or an application dot interval such that the number of application dots per unit distance becomes constant.

According to the invention of (14), the number of application dots per unit distance becomes constant, and thus the width of the masking can be kept constant and the electroplated tool having excellent chip discharge capacity according to the present invention can be manufactured even when manufacturing an electroplated tool having a complex shape like a screw-shaped grindstone for grinding a gear.

(15) In the invention of (13) or (14), the masking process favorably applies the masking agent to form the masking (the masking 5 described below, for example) while moving the nozzle in a rotation axis direction of the electroplated tool.

According to the invention of (15), the electroplated tool according to the present invention can be reliably manufactured even when manufacturing an electroplated tool having a complex shape like a screw-shaped grindstone for grinding a gear.

(16) In the invention of any one of (13) to (15), the masking process favorably uses a jet dispenser as the application device.

According to the jet dispenser used for the invention of (16), a masking material is pressurized and discharged in a dot manner to perform application, and thus the distance between the application surface and the nozzle can be separated by a fixed distance or more (about 6 mm). Therefore, the application can be performed without interfering with the parent material even when manufacturing an electroplated tool having a complex shape like a screw-shaped grindstone. Further, the masking can be formed at a high speed with high accuracy, and thus the electroplated tool according to the present invention can be favorably manufactured.

(17) To manufacture the screw-shaped grindstone for grinding a gear of any one of (6) to (8), the present invention provides a method for manufacturing a screw-shaped grindstone for grinding a gear, the method including a masking process for forming a masking on a parent material in a stripe manner in a direction perpendicular to a processing direction, and an electroplating process for electroplating abrasive grains on the parent material on which the masking has been formed.

According to the invention of (17), the screw-shaped grindstone for grinding a gear of (6) can be reliably manufactured. Further, a dot discharge application method such as a jet dispenser can be employed to form the masking in a stripe manner. Therefore, a masking with high accuracy can be applied at a high speed.

(18) In the invention of (17), a first plating process for forming a plating layer on the parent material on which the abrasive grains have been electroplated is further favorably included.

According to the invention of (18), the screw-shaped grindstone for grinding a gear (the screw-shaped grindstone illustrated in FIG. 2A, for example) of (6) without including a plating layer between the abrasive grain portions can be reliably manufactured. In the screw-shaped grindstone for grinding a gear, the chips can be easily discharged between the abrasive grain portions, and clogging is less likely to occur. Therefore, highly efficient grinding becomes possible.

(19) In the invention of (17), a masking removing process for removing the masking from the parent material on which the abrasive grains have been electroplated, and a second plating process for forming a plating layer on the parent material from which the masking has been removed are further favorably included.

According to the invention of (19), the screw-shaped grindstone for grinding a gear (the screw-shaped grindstone illustrated in FIG. 6B, for example) of (17) including the plating layer between the abrasive grain portions can be reliably manufactured. The screw-shaped grindstone for grinding a gear can prevent the abrasive grains from falling because of including the plating layer between the abrasive grain portions, and thus has high abrasive grain holding power. Therefore, highly efficient grinding becomes possible.

(20) In the invention of any one of (17) to (19), the masking process favorably causes a width between the adjacent masking to be 150 to 200% of an average particle diameter of the abrasive grains.

According to the method for manufacturing a screw-shaped grindstone for grinding a gear of (20), the screw-shaped grindstone for grinding a gear of (7) can be reliably manufactured.

(21) In the invention of any one of (17) to (20), the masking process favorably causes a width of the masking to be 100 to 800% of an average particle diameter of the abrasive grains.

According to the method for manufacturing a screw-shaped grindstone for grinding a gear of (21), the screw-shaped grindstone for grinding a gear of (8) can be reliably manufactured.

(22) In the invention of any one of (17) to (21), the masking process favorably applies, using an application device, a masking agent to form the masking while moving a nozzle of the application device to follow a shape of the parent material such that a distance between a tip of the nozzle of the application device and an application surface of the parent material becomes approximately constant.

According to the invention of (22), the distance between the application surface and the tip of the nozzle is kept approximately constant, and thus the masking can be accurately formed and the screw-shaped grindstone for grinding a gear according to the present invention can be reliably manufactured even when manufacturing a grindstone like a screw-shaped grindstone for grinding a gear having a complex shape.

(23) In the invention of (22), the masking process favorably applies the masking agent to form the masking while changing a moving speed of the nozzle or an application dot interval such that the number of application dots per unit distance becomes constant.

According to the invention of (23), the number of application dots per unit distance becomes constant, and thus the width of the masking can be kept constant and the screw-shaped grindstone for grinding a gear having excellent chip discharge capacity according to the present invention can be manufactured even when manufacturing a grindstone having a complex shape like a screw-shaped grindstone for grinding a gear.

(24) In the invention of (22) or (23), the masking process favorably applies the masking agent to form the masking while moving the nozzle in a rotation axis direction of the screw-shaped grindstone for grinding a gear.

According to the invention of (24), the screw-shaped grindstone for grinding a gear according to the present invention can be reliably manufactured even when manufacturing a grindstone having a complex shape like a screw-shaped grindstone for grinding a gear.

(25) In the invention of any one of (22) to (24), the masking process favorably uses a jet dispenser as the application device.

According to the get dispenser used for the invention of (25), the screw-shaped grindstone for grinding a gear according to the present invention can be favorably manufactured.

Effects of the Invention

According to the present invention, an electroplated tool, a screw-shaped grindstone for grinding a gear, a method for manufacturing the electroplated tool, and a method for manufacturing the screw-shaped grindstone for grinding a gear, having excellent chip discharge capacity of abrasive grains and processing accuracy, and enabling highly efficient grinding can be provided.

BRIEF DESCRIPTION OF THE DRAWINGS

FIG. 7C is a diagram illustrating a method for manufacturing a screw-shaped grindstone for grinding a gear according to the second embodiment;

FIG. 7D is a diagram illustrating a method for manufacturing a screw-shaped grindstone for grinding a gear according to the second embodiment.

PREFERRED MODE FOR CARRYING OUT THE INVENTION

Hereinafter, a first embodiment according to the present invention will be described on the basis of the drawings. Note that, in the description of a second embodiment and subsequent description, configurations common to the first embodiment are denoted with signs according to common regularity, and its description is appropriately omitted. Note that the present invention is not limited to the following embodiments.

<Electroplated Tool>

Figure 1:
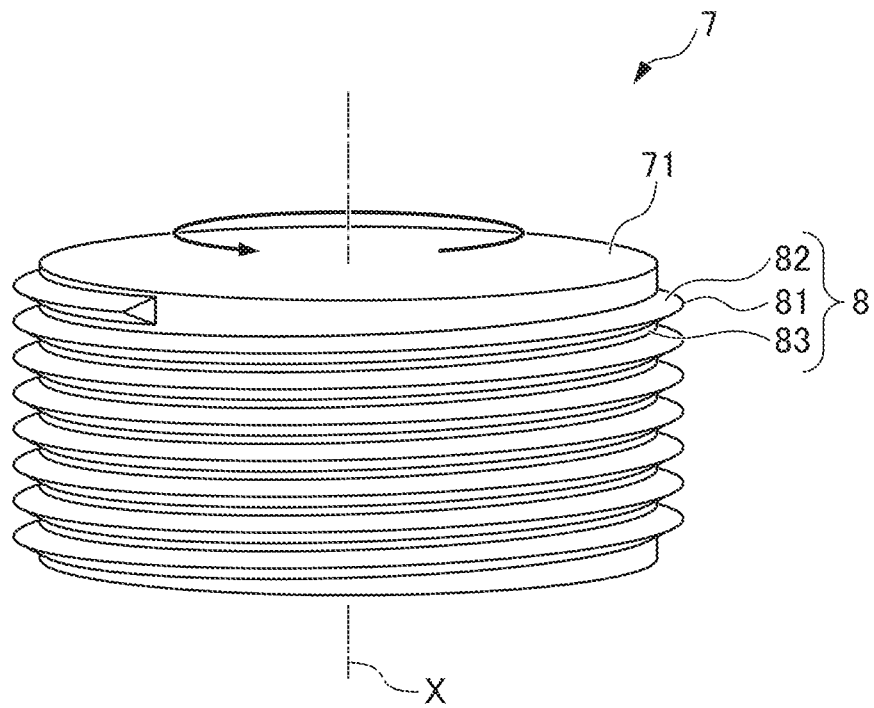
FIG. 1 is a perspective view of an electroplated tool according to a first embodiment of the present invention.

FIG. 1 is a perspective view of an electroplated tool according to the first embodiment of the present invention. An electroplated tool 7 illustrated in FIG. 1 is used as a screw-shaped grindstone for grinding a gear. In the electroplated tool 7, a screw-shaped portion 8 is formed in an outer peripheral portion of a tool body 71 having an approximately columnar shape.

The screw-shaped portion 8 includes an apex portion 81 positioned in an outermost periphery in a radial direction and forming a plane, an inclined portion 82 extending inward at a fixed inclined angle in the radial direction, and a groove portion 83 connecting the inclined portions 82. Abrasive grains (not illustrated) to be described in detail below are electroplated on a surface of the screw-shaped portion 8. The electroplated tool 7 is rotated around a rotation axis line X by a drive device (not illustrated), and the screw-shaped portion 8 is meshed with a gear to perform grinding.

Figure 2:
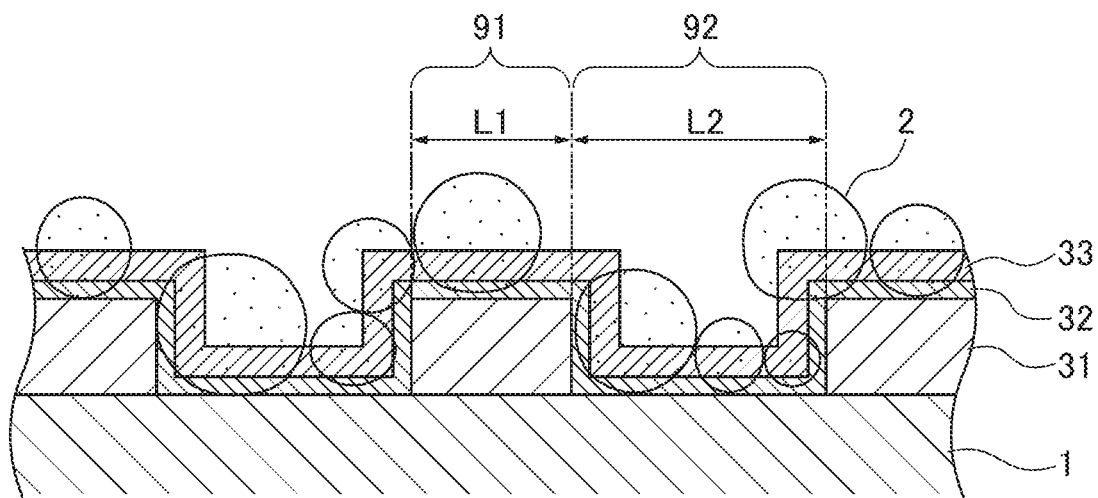
FIG. 2 is a partial sectional view of the electroplated tool according to the first embodiment.

FIG. 2 is a partial sectional view of the electroplated tool according to the first embodiment. A first plating layer 31 is formed provided with a difference in height on a parent material 1 in a stripe manner in a direction intersecting a processing direction of the tool. Further, abrasive grains 2 are arranged on the parent material 1 and the first plating layer 31 and are fixed by a second plating layer 32 and a third plating layer 33. The second plating layer 32 is a layer electroplated when the abrasive grains 2 are temporarily fixed, and the third plating layer 33 is a layer formed when the abrasive grains 2 are permanently fixed.

A high-level portion 91 is formed of the first plating layer 31, the second plating layer 32, and the third plating layer 33. The width of the high-level portion 91 is equal to the width of the first plating layer, and has a width L1. Further, a low-level portion 92 is formed of the second plating layer 32 and the third plating layer 33. The width of the low-level portion 92 is equal to an interval between the adjacent high-level portions 91, that is, an interval between the adjacent first plating layers 31, and has a width L2.

When the electroplated tool 7 of the present embodiment is used for grinding processing, only the abrasive grains 2 electroplated in the high-level portion 91 perform grinding, and chips are discharged through the low-level portion 92 adjacent to the high-level portion 91.

The parent material 1 used in the present embodiment is a base material of the electroplated tool and is not especially limited as long as the parent material 1 has conductivity. A metal such as iron, tungsten, titanium, or molybdenum, or an iron-based alloy is favorably used, for example.

The abrasive grains 2 used in the first embodiment are limited. However, in a case where the abrasive grains 2 are used in an electroplated tool for grinding a gear, superabrasive grains of CBN or diamond, or alumina are favorably used.

The particle diameter of the abrasive grain 2 is not especially limited. However, the abrasive grains 2 having the particle diameter of 50 to 180 µm are favorably used.

As a method for forming the plating layer 31 and the plating layer 33, an electroplating method or an electroless plating method is favorably used, for example.

Further, as a method for forming the plating layer 32, an electroplating method is favorably used, for example. That is, the plating layer 32 can be formed together with the abrasive grains 2 by electroplating.

Further, a metal used for plating is not especially limited. However, nickel, chromium, copper, or the like are favorably used.

Further, it is favorable that the plating layer 33 reaches the point of about 60% of an average particle diameter of the abrasive grains 2. In a case where the plating layer 33 is thinner than this point, the abrasive grains 2 easily fall off and in the case where the plating layer 33 is thicker than this point, a gap for discharging chips is compressed and the chips are discharged with difficulty.

Next, favorable forming conditions of the high-level portion 91 in the present embodiment will be described in detail.

The difference in height between the high-level portion 91 and the low-level portion 92, that is, the thickness of the plating layer 31 is favorably 50 to 100% of the average particle diameter of the abrasive grains 2. In these conditions, the abrasive grains 2 electroplated in the high-level portion 91 almost always protrude. Especially, in a case where the difference in the minimum value and the maximum value of particle diameter distribution are within 50% of the average particle diameter, apex portions of the abrasive grains 2 of the high-level portion 91 reliably protrude. Therefore, the gap through which the chips are discharged is reliably guaranteed in the low-level portion 92.

The width L1 of the high-level portion 91, that is, the width of the plating layer 31 is favorably 150 to 200% of the average particle diameter of the abrasive grains 2. In such a condition, the average number of abrasive grains in a width direction of the abrasive grains 2 electroplated on the plating layer 31 is two or less. Therefore, a portion adjacent to the low-level portion 92 is created in each of the abrasive grains, and thus the chips become easily discharged through the portion.

Further, in these conditions, the average number of the abrasive grains in the width direction of the abrasive grains 2 electroplated on the plating layer 31 is one or more. Therefore, an average of 1 abrasive particle protrudes in the width direction of the high-level portion 91, and thus uniform grinding becomes possible and processing accuracy is guaranteed.

The width L2 of the low-level portion 92, that is, an interval between the plating layers 31 is favorably 100% or more of the average particle diameter of the abrasive grains 2.

The width L2 of the low-level portion 92 is wider than the average particle diameter of the abrasive grains 2, and thus the chips can be easily discharged through the low-level portion 92, and clogging is suppressed. In a case where the width L2 of the low-level portion 92 is too wide, the number of the abrasive grains performing grinding is decreased, and thus processing accuracy decreases. Therefore, the width L2 of the low-level portion 92 is favorably 100 to 800% of the average particle diameter of the abrasive grains 2.

Next, the point that the processing accuracy is guaranteed by the high-level portion 91 formed in a stripe manner will be described.

Figure 3A:
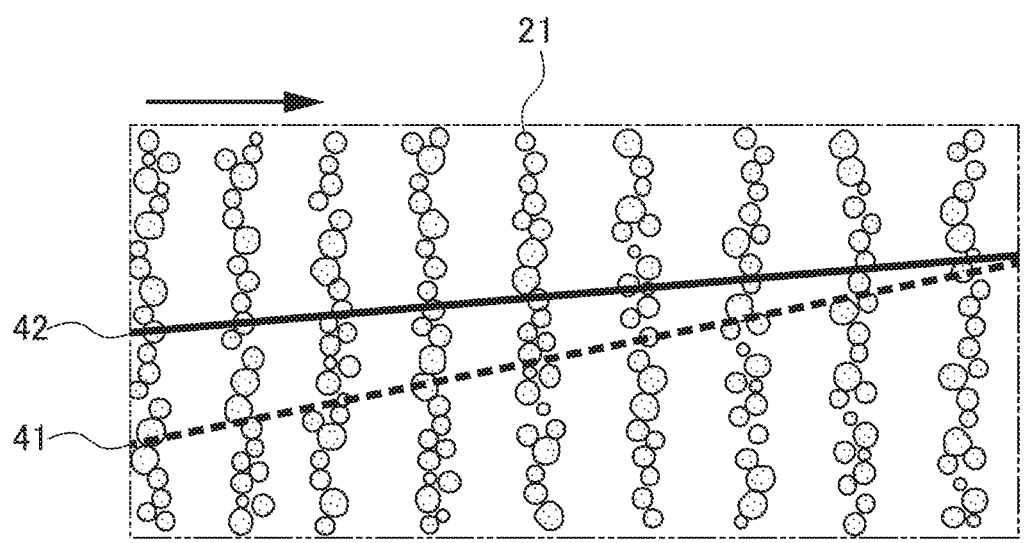
FIG. 3A is a plan view of a grindstone surface of the electroplated tool according to the first embodiment.

FIG. 3A is a schematic diagram of a surface of the parent material 1 according to the first embodiment. The abrasive grains 21 illustrate abrasive grains arranged in the high-level portion 91 in a stripe manner. The abrasive grains 21 are arranged in a stripe manner in a direction intersecting the processing direction of the tool illustrated by the arrow in FIG. 3A.

Here, the aggregate of points of the abrasive grains actually coming into contact with a work piece is called line of action. In actual processing, the position and angle of the line of action are changed during processing to modify a tooth form such as crowning in which the tooth thickness is gradually changed from a central portion to an end portion in a tooth trace direction along the tooth trace so that meshing of the teeth on a drive side and a driven side becomes favorable. In the present embodiment, even when the line of action is changed from 41 to 42, the number of acting abrasive grains and the interval between the acting abrasive grains are changed within a fixed range according to the change of the position and angle of the line of action. Therefore, even when the position and angle of the line of action is changed to some extent, processing accuracy is guaranteed.

Figure 3B:
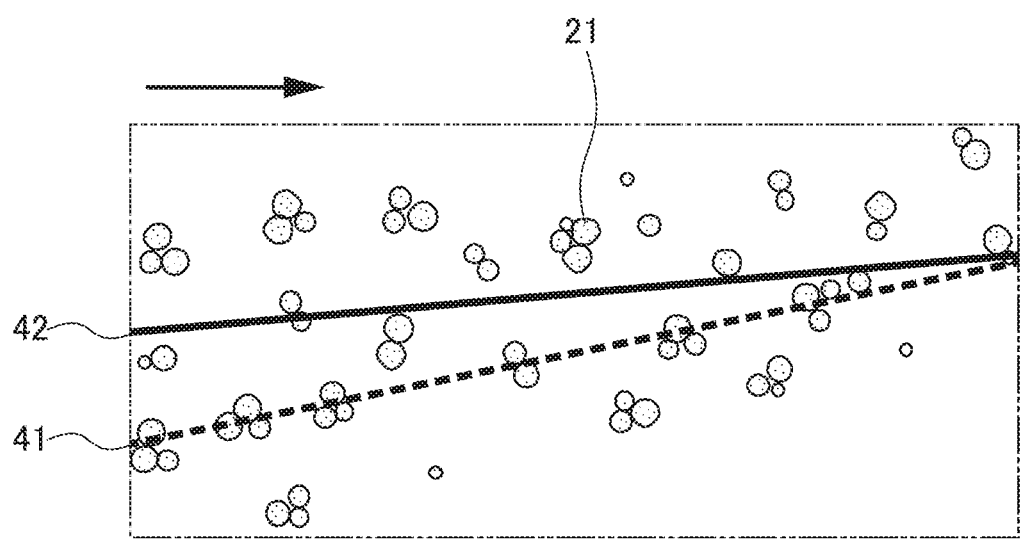
FIG. 3B is a plan view of a grindstone surface of a conventional electroplated tool.

FIG. 3B is a schematic diagram of a surface of a conventional parent material on which abrasive grains are randomly arranged. In such a configuration, the processing accuracy is not guaranteed when the gap between the abrasive grains is too wide. In addition, the number and the interval of acting abrasive grains are randomly changed when an angle change or position change of the line of action is made. Therefore, processing accuracy is not guaranteed.

<Method for Manufacturing Electroplated Tool>

Figure 4A:
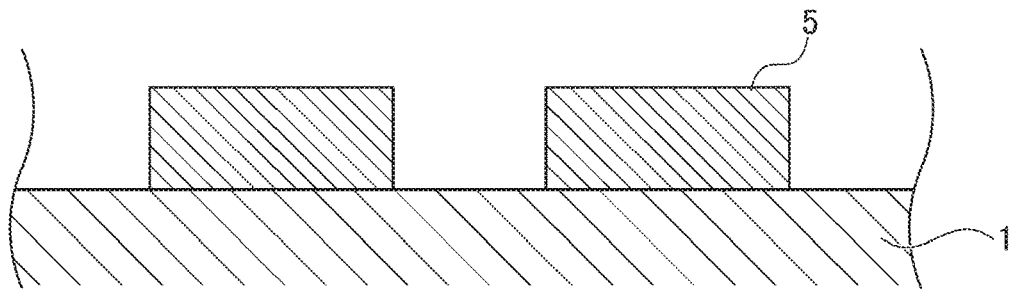
FIG. 4A is a diagram illustrating a method for manufacturing an electroplated tool according to the first embodiment.
Figure 4B:
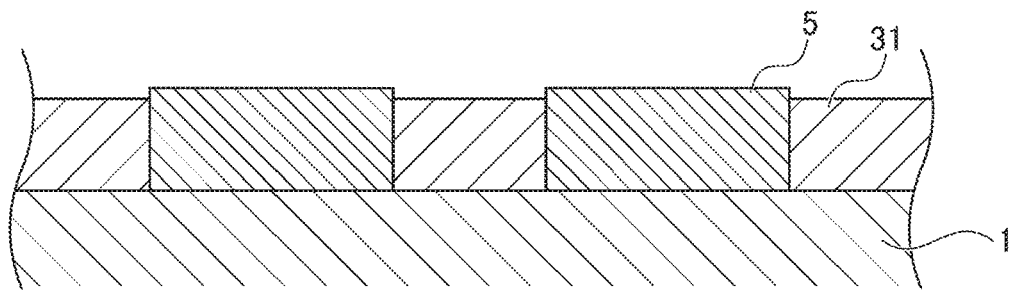
FIG. 4B is a diagram illustrating a method for manufacturing an electroplated tool according to the first embodiment.
Figure 4C:
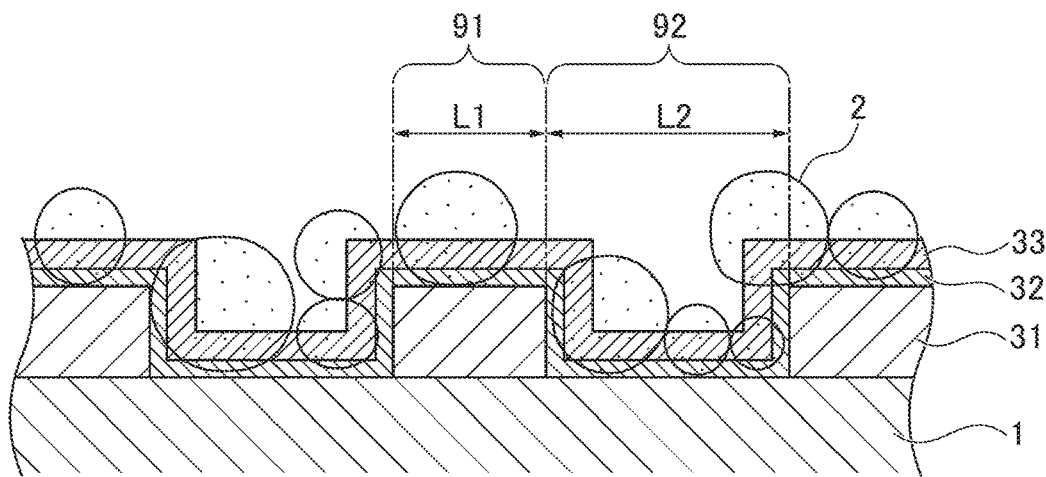
FIG. 4C is a diagram illustrating a method for manufacturing an electroplated tool according to the first embodiment.

FIGS. 4A to 4C are diagrams illustrating a form of a method for manufacturing an electroplated tool according to the first embodiment.

The method for manufacturing an electroplated tool of the present embodiment includes a masking process for forming a masking on a parent material in a stripe manner in a direction intersecting a processing direction, a first plating process for forming a plating layer on the parent material on which the masking has been formed, an electroplating process for electroplating abrasive grains after removing the masking from the parent material on which the plating layer has been formed, and a second plating process for forming a plating layer on the parent material on which the abrasive grains have been electroplated.

First, in the masking process, a masking 5 is formed on the parent material 1 in a stripe manner in the direction intersecting the processing direction of the tool, using a jet dispenser (FIG. 4A).

Figure 5A:
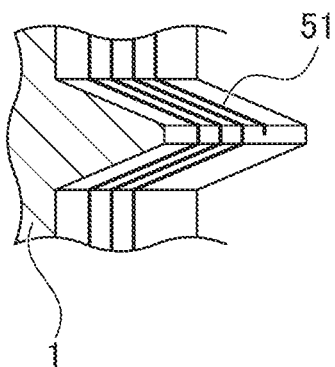
FIG. 5A is a view illustrating a method for masking a screw-shaped grindstone for grinding a gear according to the first embodiment.

FIG. 5A is a view illustrating the state in which a masking is applied on a screw-shaped grindstone for grinding a gear according to the first embodiment of the present invention. As illustrated in FIG. 5A, a masking 51 is applied on the parent material 1 in a stripe manner in the direction intersecting the processing direction.

Figure 5B:
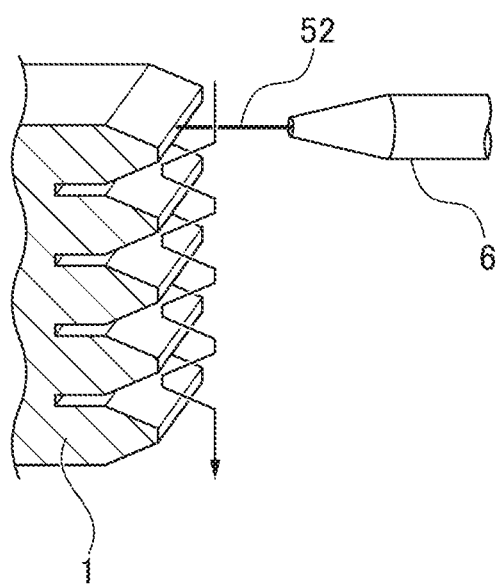
FIG. 5B is a view illustrating a method for masking a screw-shaped grindstone for grinding a gear according to the first embodiment.

FIG. 5B is a view illustrating a method for masking the screw-shaped grindstone for grinding a gear according to the first embodiment of the present invention. As illustrated in FIG. 5B, a dispenser 6 filled with a masking material follows the shape of the parent material 1, and masking application is performed in a state where the distance between a dispenser nozzle and a surface of the parent material is kept approximately constant.

Further, it is favorable to perform masking while changing a feed speed or an application dot interval of the dispenser according to a nozzle angle with respect to an application surface. The screw-shaped grindstone for grinding a gear includes, in a cross section including an axial line of the screw-shaped grindstone, a linear rack shape including an apex portion positioned in an outermost periphery in a radial direction and forming a plane and an inclined portion extending inward at a fixed inclined angle in the radial direction, and a groove portion connecting the inclined portions.

The feed speed and the application dot interval of the dispenser are controlled according to the change of such a shape, whereby the application can be performed such that the number of application dots per unit application surface becomes uniform.

To be specific, first, in a case where a dispenser feed speed f is changed, an application dot interval s=F/t is obtained, where an application time interval is t (the number of dots/second), a speed with respect to the application surface is F (mm/second), the application dot interval is s (mm/the number of dots), and an angle between an application surface tangential line and a dispenser normal line is θ. Therefore, the dispenser feed speed f can be expressed by the following expressions (1) and (2). Further, in a case where the application time interval t is changed, t can be expressed by the following expression (3). The dispenser is controlled according to these expressions, whereby the application can be performed.

[Expression 1]

$$f = F \times \sin\theta \quad \text{Expression (1)}$$

$$f = s \times t \times \sin\theta \quad \text{Expression (2)}$$

$$t = s/f \times \sin\theta \quad \text{Expression (3)}$$

Further, it is favorable to apply the masking while moving the dispenser in a rotation axis direction of the screw-shaped grindstone. According to this method, the electroplated tool according to the present invention can be reliably manufactured even when an electroplated tool having a complex shape like a screw-shaped grindstone for grinding a gear is manufactured.

A masking device in the present embodiment is configured to incorporate a dispenser or the like that applies a masking onto a device provided with an axis movable in an axial line direction of an electroplated tool and an axis perpendicular to the axial line direction of the electroplated tool, and to incorporate a screw-shaped electroplated tool into a device provided with a rotation axis capable of rotation indexing.

As the dispenser used in the method for manufacturing an electroplated tool of the present embodiment, a jet dispenser is favorably used. The jet dispenser can be secured at a distance to an object of up to about 6 mm, and thus can perform application without physically interfering with the parent material. A commercialized product can be used as the jet dispenser, and AERO JET manufactured by Musashi engineering, Inc. can be used, for example.

In the present embodiment, the type of the masking material is not especially limited as long as the material withstands a temperature of about 90° C., which is a condition of electroless plating, and has chemical resistance.

Referring back to FIG. 4B, next, as the first plating process, the first plating layer 31 is formed on the parent material 1. An example of a method for forming a plating layer includes a method for immersing the parent material 1 in a plating bath (Watts bath or electroless Ni—P bath) and performing electroplating or electroless plating. The thickness of the first plating layer 31 is favorably 50 to 100% of the average particle diameter of the abrasive grains.

Next, after the masking 5 is removed, the abrasive grains 2 are filled and are temporarily fixed by an electroplating method or the like, as the electroplating process. An example of a temporary fixing method includes a method for immersing the parent material 1 in a plating bath (Watts bath) mixed with the abrasive grains 2, and performing electroplating.

Finally, after unnecessary abrasive grains are removed by washing, the plating layer 33 is formed by an electroless plating method or the like and the abrasive grains are permanently fixed, as the second plating process (FIG. 4C). The method for forming the plating layer 33 is similar to the above-described method for forming the plating layer 31.

According to the present embodiment, the following effects are exhibited.

In the electroplated tool of the present embodiment, the abrasive grains are arranged with a difference in height in a stripe manner in the direction intersecting the processing direction of the tool. Therefore, only the abrasive grains in the high-level portion perform grinding, and the chips generated at the time of grinding are efficiently discharged through the low-level portion. Therefore, excellent chip discharge capacity can be obtained, and highly efficient grinding becomes possible. Further, even when the position and angle of the line of action of the tool are changed at the time of processing, the interval and the number of the abrasive grains participating in the processing fall within a fixed range, because of including the high-level portion formed in a stripe manner in the direction intersecting the processing direction of the tool. Therefore, processing accuracy is guaranteed.

Further, according to the method for manufacturing an electroplated tool of the present embodiment, even when a masking is formed on a screw-shaped grindstone having a complex shape, the masking can be formed with high accuracy, and the electroplated tool can be manufactured.

<Screw-Shaped Grindstone for Grinding a Gear>

Next, a second embodiment of the present invention will be described on the basis of the drawings.

Figure 6A:
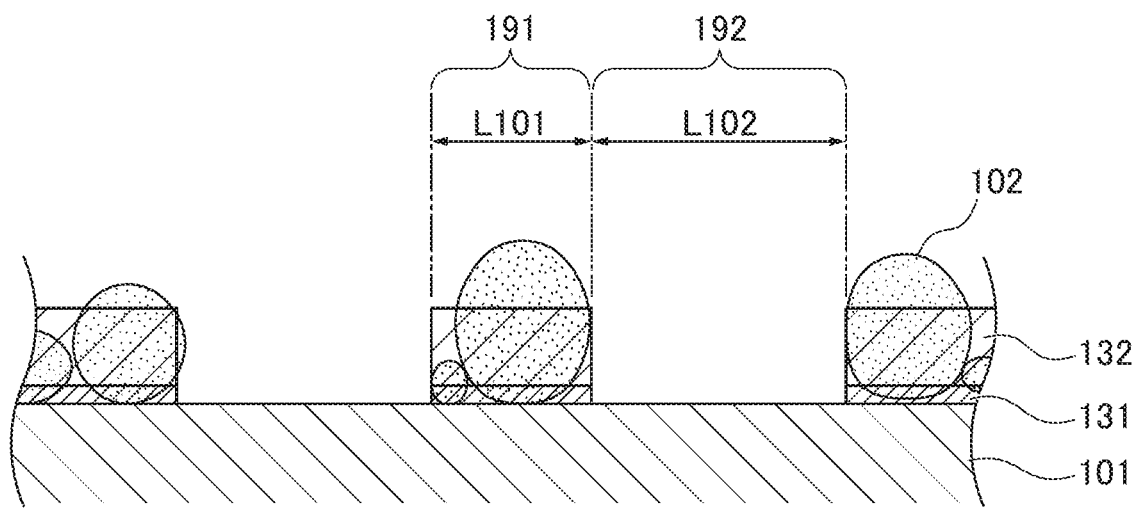
FIG. 6A is a partial sectional view of a screw-shaped grindstone for grinding a gear according to a second embodiment.

FIG. 6A is a partial sectional view of a screw-shaped grindstone for grinding a gear according to the second embodiment. The screw-shaped grindstone for grinding a gear of the present embodiment includes, on a parent material 101, an abrasive grain portion 191 formed in a stripe manner in a direction perpendicular to a processing direction of the tool. The abrasive grain portion 191 is formed in such a manner that abrasive grains 102 are fixed on the parent material 101 with a first plating layer 131 and a second plating layer 132. The first plating layer 131 is an electroplated layer when the abrasive grains 102 are temporarily fixed, and the second plating layer 132 is a formed layer when the abrasive grains 102 are permanently fixed.

The width of the abrasive grain portion 191 is equal to the first plating layer 131 and the second plating layer 132, and has a width L101. A low-level portion 192 is formed between the adjacent abrasive grain portions 191 because the abrasive grains 102, the first plating layer 131, and the second plating layer 132 are not arranged. The width of the low-level portion 192 is equal to the interval between the adjacent abrasive grain portions 191, that is, the interval between the adjacent first plating layers 131 and between the adjacent second plating layers 132, and has a width L102.

The plating layers 131 and 132 are not provided in the low-level portion 192, and are provided only in the abrasive grain portion 191 where the abrasive grains 102 are fixed. Therefore, a gap is included between the plating layers. When a screw-shaped grindstone for grinding a gear of the present embodiment is used for grinding, chips are discharged through the low-level portion 192.

Figure 6B:
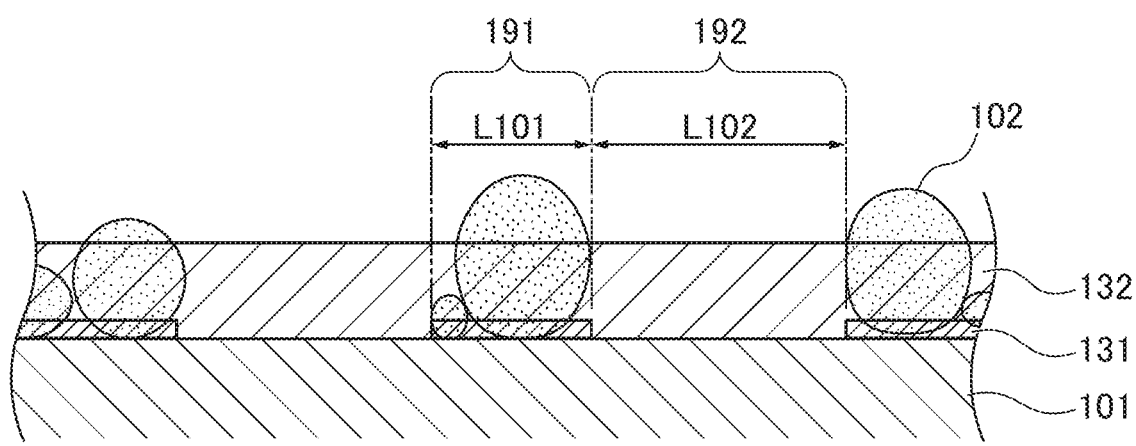
FIG. 6B is a partial sectional view of a screw-shaped grindstone for grinding a gear according to the second embodiment.
Figure 7A:
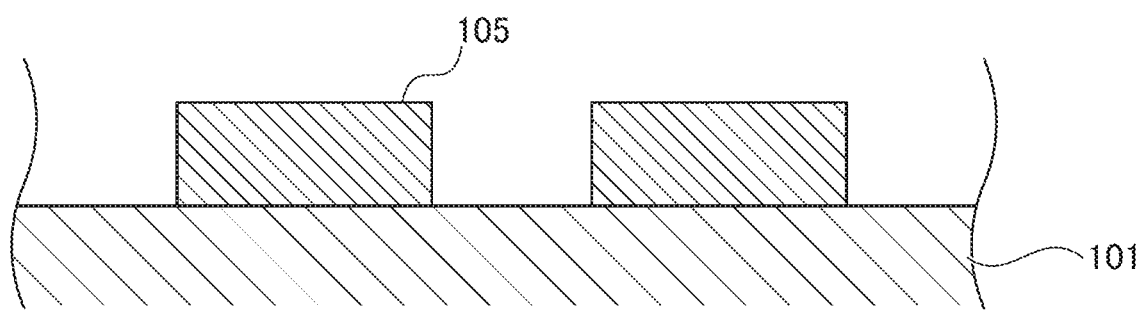
FIG. 7A is a diagram illustrating a method for manufacturing a screw-shaped grindstone for grinding a gear according to the second embodiment.
Figure 7B:
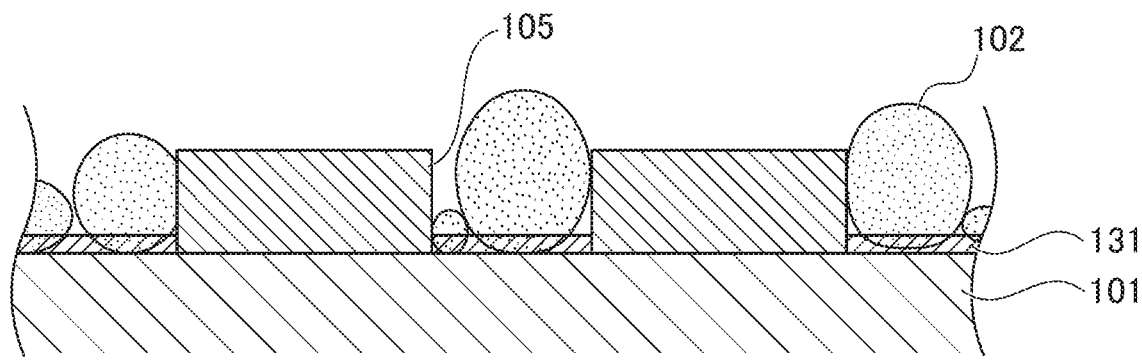
FIG. 7B is a diagram illustrating a method for manufacturing a screw-shaped grindstone for grinding a gear according to the second embodiment.

FIG. 6B is a partial sectional view of the screw-shaped grindstone for grinding a gear according to the second embodiment, similarly to FIG. 6A. The screw-shaped grindstone for grinding a gear of the present embodiment includes the abrasive grain portion 191 formed on the parent material 101 in a stripe manner in the direction perpendicular to the processing direction of the tool. The abrasive grain portion 191 is formed as the abrasive grains 102 are fixed on the parent material 101 with the first plating layer 131 and the second plating layer 132. The first plating layer 131 is an electroplated layer when the abrasive grains 102 are temporarily fixed, and the second plating layer 132 is a layer formed when the abrasive grains 102 are permanently fixed.

The width of the abrasive grain portion 191 is equal to the width of the first plating layer 131, and has the width L101. The low-level portion 192 is formed between the adjacent abrasive grain portions 191 because the abrasive grains 102 and the first plating layer 131 are not arranged there. The width of the low-level portion 192 is equal to the interval between the adjacent abrasive grain portions 191, that is, the interval between the adjacent first plating layers 131, and has the width L102.

The first plating layer 131 is not provided in the low-level portion 192, and is provided only in the abrasive grain portion 191 where the abrasive grains 102 are fixed. When the screw-shaped grindstone for grinding a gear of the present embodiment is used for grind processing, the chips are discharged through the low-level portion 192. The second plating layer 132 is formed on the low-level portion 192, and thus the holding power of the abrasive grains 102 at the time of grinding is enhanced.

As a method for forming the first plating layer 131, an electroplating method is favorably used, for example.

Further, as a method for forming the second plating layer 132, an electroplating method or an electroless plating method is favorably used, for example.

Next, favorably forming conditions of the abrasive grain portion 191 formed of the abrasive grains 102 in the present embodiment will be described.

The width L101 of the abrasive grain portion 191 formed in a stripe manner with the abrasive grains 102 is favorably 150 to 200% of an average particle diameter of the abrasive grains 102. When the width of the abrasive grain portion 191 falls within this range, the average number of the abrasive grains in a width direction of the abrasive grain portion 191 is two or less. Therefore, a portion not in contact with another abrasive grain 102 is created in the abrasive grains 102, and thus the chips can be easily discharged through this portion.

Further, under this condition, the average number of abrasive grains in the width direction of the abrasive grains 102 fixed on the plating layer 131 is one or more. Therefore, an average of 1 abrasive particle protrudes in the width direction of the abrasive grain portion 191, and thus uniform grinding becomes possible and processing accuracy is guaranteed.

Further, the width L102 of the low-level portion, which is the interval between the adjacent abrasive grain portions 191, is favorably 100% or more of the average particle diameter of the abrasive grains 102. The width L102 becomes the average particle diameter of the abrasive grains 102 or more, and thus the chips can be easily discharged through the low-level portion 192. When the width L102 is too wide, the number of the abrasive grains performing grinding is decreased, and thus processing accuracy decreases. Therefore, the width L102 is more favorably 100 to 800% of the average particle diameter of the abrasive grains 102.

Further, the abrasive grain portion 191 is formed in a stripe manner, and thus the processing accuracy is guaranteed, similarly to the first embodiment.

<Method for Manufacturing Screw-shaped Grindstone for Grinding a Gear>

FIGS. 7A to 7D are diagrams illustrating a form of a method for manufacturing a screw-shaped grindstone for grinding a gear according to the second embodiment.

The method for manufacturing a screw-shaped grindstone for grinding a gear according to the present embodiment includes a masking process for forming a masking 105 on the parent material 101 in a stripe manner in a direction perpendicular to a processing direction, and an electroplating process for electroplating the abrasive grains 2 on the parent material 1 on which the masking 105 has been formed.

Further, the method favorably includes a first plating process for forming a plating layer on the parent material on which the abrasive grains 102 have been electroplated, or a masking removing process for removing the masking 105 from the parent material 101 on which the abrasive grains 102 have been electroplated and a second plating process for forming a plating layer on the parent material from which the masking 105 has been removed.

First, in the masking process, the masking 105 is formed on the parent material 101 in a stripe manner in the direction perpendicular to the processing direction of the tool.

Next, as the electroplating process, the abrasive grains 102 are filled, the first plating layer 131 is formed by an electroplating method or the like, and the abrasive grains are temporarily fixed. An example of a temporary fixing method includes a method for immersing the parent material 101 in a plating bath (Watts bath) mixed with the abrasive grains 102, and performing electroplating. Next, after unnecessary abrasive grains are washed off, the plating layer 132 is formed, and the abrasive grains are permanently fixed, as the first plating process (FIG. 7C). Finally, the masking 105 is removed.

Alternatively, after the temporary fixation of the abrasive grains 102 is performed by the electroplating process, the masking 105 may be removed as the masking removing process and then the plating layer 132 may be formed by an electroless plating method or the like and the permanent fixation of the abrasive grains may be performed, as the second plating process (FIG. 7D).

According to the present embodiment, following effects are exhibited.

In the screw-shaped grindstone for grinding a gear of the present embodiment, the abrasive grain portion 191 formed in a stripe manner is arranged in the direction perpendicular to the processing direction of the tool. Therefore, when the chips generated inside in a grindstone radial direction are discharged to the outside in the grindstone radial direction by centrifugal force, the chips are efficiently discharged through a gap of the abrasive grain portion 191 without being caught in the abrasive grain portion 191 outside in the grindstone radial direction. Further, even when the position and angle of the line of action of the tool are changed at the time of processing, the interval of the abrasive grains 102 participating in the processing becomes constant, because of including the abrasive particle portion 191 formed in a stripe manner in the direction intersecting the processing direction of the tool. Therefore, the screw-shaped grindstone for grinding a gear can be used in the range where processing accuracy is guaranteed.

Further, according to the method for manufacturing a screw-shaped grindstone for grinding a gear of the present embodiment, the masking 105 can be formed with high accuracy and the screw-shaped grindstone for grinding a gear can be manufactured, even when the masking 105 is formed on a screw-shaped grindstone having a complex shape.

Note that the present invention is not limited to the above-described embodiments, and modifications and improvements within the scope that can achieve the objective of the present invention are included in the present invention.

EXAMPLES

Hereinafter, the present invention will be described in more detail on the basis of examples. However, the present invention is not limited by the examples.

Examples 1 to 4 and Comparative Example 1

The electroplated tools of Examples 1 to 4 and Comparative Example 1 were produced using CBN of an average particle diameter of 90 μm as the abrasive grains, and using electroless plating for plating.

Further, the numbers of the abrasive grains in the width direction per one line of the high-level portion are 1.5 to 2.0 (Examples 1 and 4), 2.0 to 2.5 (Example 2), and 2.5 to 3.0 (Example 3), respectively. These numbers correspond to the conditions of the width of the high-level portion being 150 to 200% (Examples 1 and 4), 200 to 250% (Example 2) and 250 to 300% (Example 3), of the average particle diameter of the abrasive grains, respectively. The widths of the low-level portion were 300 μm (Examples 1 to 3) and 800 μm (Example 4), respectively. Meanwhile, in Comparative Example 1, the high-level portion was not provided, and thus no gap was provided between the abrasive grains. These widths correspond to the conditions of the width of the low-level portion being 100 to 800% (Examples 1 to 3) and 800% or more (Example 4) of the average particle diameter of the abrasive grains, respectively, and a condition (Comparative Example 1) without including the low-level portion.

TABLE 1

| Number of abrasive grains in high-level portion | Processing scaling factor | | | | | | | |
|---|---|---|---|---|---|---|---|---|
|  | 1 | 1.5 | 2 | 2.5 | 3 | 3.5 | 4 | 4.5 |
| 1.5 ≤ line < 2.0 (Examle 1) | 3 | 3 | 3 | 3 | 3 | 3 | 3 | 3 |
| 2.0 ≤ line < 2.5 (Examle 2) | 3 | 2 | 1 | 1 | 1 | 1 | 1 | 1 |
| 2.5 ≤ line < 3.0 (Examle 3) | 3 | 2 | 1 | 1 | 1 | 1 | 1 | 1 |

<Number of Abrasive Grains of High-Level Portion and Number of Portions of Clogging>

The following tests were performed using the electroplated tools of Examples 1 to 3. Grinding of a work piece was performed while changing a processing scaling factor, where the chip volume Qw (mm$^3$/sec) discharged per unit time is a processing scaling factor 1 (that is, the removal volume per unit time is large when the processing scaling factor is large, and the grinding is performed with high efficiency). Clogged portions after passage of a fixed amount of time were observed. Results were evaluated on the basis of the following criteria and illustrated in Table 1. Evaluation 3 is acceptable.

3: Occurrence of clogging is not confirmed.
2: Clogging is slightly confirmed.
1: Clogging is confirmed in a large number of portions.

Comparing Examples 1 to 3, the number of portions of clogging was increased as the processing scaling factor was increased in Examples 2 and 3, whereas the portion of clogging rarely occurred as the processing scaling factor was increased in Example 1. From the above results, it has been confirmed that clogging is less likely to occur even when the processing scaling factor is increased in the case where the width of the high-level portion of the electroplated tool is 150 to 200% of the average particle diameter of the abrasive grains, and thus efficient grinding is possible.

<Width of Low-Level Portion and Clogging Frequency>

Figure 8:
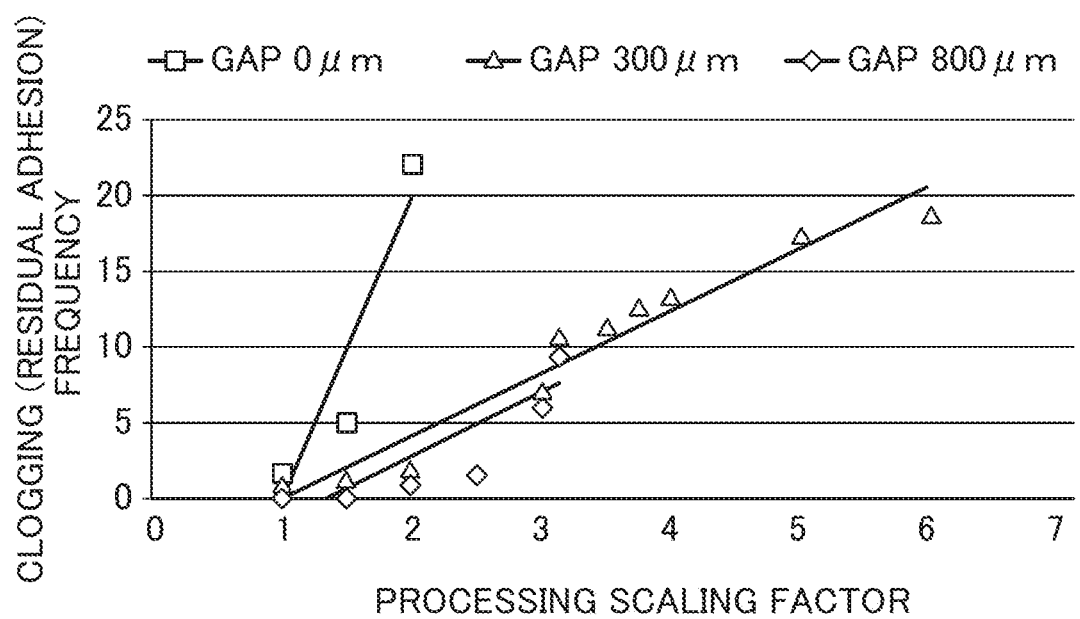
FIG. 8 is a graph illustrating a relationship between a width of a low-level portion and s clogging frequency.

FIG. 8 is a graph illustrating the relationship between the width of the low-level portion and clogging frequency In the graph, the clogging frequency is a numerical value proportional to the number of portions of clogging of the grindstone. The vertical axis represents the clogging frequency and the horizontal axis represents the processing scaling factor.

As illustrated in FIG. 8, in the electroplated tool of Comparative Example 1, the clogging frequency sharply increases when the processing scaling factor became 2 or more, an overload occurred, and grinding became impossible. In the electroplated tool of Example 4, the clogging frequency increases when the processing scaling factor became 3 or more, and an objective tooth form could not be obtained. In contrast, in the electroplated tool of Example 1, the increase in the clogging frequency was gentle even when the processing scaling factor was increased. When the processing scaling factor exceeded 6, an overload occurred and grinding became impossible.

From the above results, comparing Example 1 and Comparative Example 1, it has been confirmed that the clogging is less likely to occur even when the processing scaling factor is increased in the electroplated tool having the level difference than in the electroplated tool without a level difference. Further, comparing Example 1 and Example 4, it has been confirmed that an objective shape cannot be obtained when the processing scaling factor is increased in the electroplated tool having the width of the low-level portion of 800 μm.

Therefore, it has been confirmed that, according to the electroplated tool in which the width of the low-level portion of the plating layer is 100 to 800% of the average particle diameter of the abrasive grains, clogging is less likely to occur even when the processing scaling factor is increased, and the grinding with high accuracy is possible.

Examples 5 and 6

The screw-shaped grindstones for grinding a gear of Examples 5 and 6 were produced by the following method. The electroplated grindstones including an abrasive particle portion formed in a stripe manner in the direction perpendicular to the processing direction of the tool were produced using CBN of the average particle diameter of 90 μm as the abrasive grains. The electroplated grindstone were produced such that the width of the abrasive grain portion is 150 to 200% of the average particle diameter of the abrasive grains, and the interval between the abrasive grain portions is 100 to 800% of the average particle diameter of the abrasive grains. The abrasive grains were fixed on the parent material by electroless nickel phosphorus plating, and a plating thickness of 60 μm was obtained. The plating layer was included between the abrasive grain portions in Example 5, and the plating layer was not included between the abrasive grain portions in Example 6.

<Abrasive Grain Holding Power Test>

The shearing load of when the abrasive grains fall was measured, and the abrasive grain holding power was measured. Comparing Examples 5 and 6, it has been found that the shearing load of when the abrasive grains fall is higher in Example 5 than Example 6. From this result, it has been confirmed that, according to the screw-shaped grindstone for grinding a gear of the present invention without including a gap in the plating layer, the abrasive grains can be held by higher holding power, and highly efficient grinding can be realized.

EXPLANATION OF REFERENCE NUMERALS 1 and 101 Parent material
2 and 102 Abrasive grains
31 and 131 First plating layer
32 and 132 Second plating layer
33 Third plating layer
41 and 42 Line of action
5, 51, 52 and 105 Masking
6 Dispenser
7 Electroplated tool (screw-shaped grindstone for grinding a gear)
71 Tool body
8 Screw-shaped portion
81 Apex portion
82 Inclined portion
83 Groove portion
91 High-level portion
92 Low-level portion
191 Abrasive grain portion
192 Interval between abrasive grain portions
L1 Width of high-level portion
L2 With of low-level portion
L101 Width of abrasive grain portion
L102 Interval between abrasive grain portions
L102 Interval between abrasive grain portions

The invention claimed is:

1. An electroplated tool comprising:
a parent material;
a plating layer formed provided with a difference in height in a stripe manner on the parent material in a direction intersecting a processing direction, and having a high-level portion and a low-level portion; and
abrasive grains provided by electroplating, and exposed on a surface of the plating layer,
wherein the difference in height of the plating layer is 50 to 100% of an average particle diameter of the abrasive grains.

2. The electroplated tool according to claim 1, wherein a width of the high-level portion of the plating layer is 150 to 200% of an average particle diameter of the abrasive grains.

3. The electroplated tool according to claim 1, wherein a width of the low-level portion of the plating layer is 100 to 800% of an average particle diameter of the abrasive grains.

4. The electroplated tool according to claim 1, wherein the electroplated tool is a screw-shaped grindstone for grinding a gear.

5. A screw-shaped grindstone for grinding a gear comprising:
a parent material; and
an abrasive grain portion formed on the parent material in a stripe manner in a direction perpendicular to a processing direction, and including abrasive grains,
wherein a width of the abrasive grain portion is 150 to 200% of an average particle diameter of the abrasive grains.

6. The screw-shaped grindstone for grinding a gear according to claim 5, wherein
an interval between the adjacent abrasive grain portions is 100 to 800% of an average particle diameter of the abrasive grains.

7. A method for manufacturing an electroplated tool, the method comprising:
- a masking process for forming a masking on a parent material in a stripe manner in a direction intersecting with a processing direction;
- a first plating process for forming a plating layer on the parent material on which the masking has been formed;
- an electroplating process for electroplating abrasive grains after removing the masking from the parent material on which the plating layer has been formed; and
- a second plating process for forming a plating layer on the parent material on which the abrasive grains have been electroplated,
- wherein the masking process causes a width between the adjacent maskings to be 150 to 200% of an average particle diameter of the abrasive grains.

8. The method for manufacturing an electroplated tool according to claim 7, wherein
the first plating process causes a thickness of the plating layer to be 50 to 100% of an average particle diameter of the abrasive grains.

9. The method for manufacturing an electroplated tool according to claim 7, wherein
the masking process causes a width of the masking to be 100 to 800% of an average particle diameter of the abrasive grains.

10. The method for manufacturing an electroplated tool according to claim 7, wherein
the electroplated tool is a screw-shaped grindstone for grinding a gear, and
the masking process applies, using an application device, a masking agent to form the masking while moving a nozzle of the application device to follow a shape of the parent material such that a distance between a tip of the nozzle of the application device and an application surface of the parent material becomes approximately constant.

11. The method for manufacturing an electroplated tool according to claim 10, wherein
the masking process applies the masking agent to form the masking while changing a moving speed of the nozzle or an application dot interval such that the number of application dots per unit distance becomes constant.

12. The method for manufacturing an electroplated tool according to claim 10, wherein
the masking process applies the masking agent to form the masking while moving the nozzle in a rotation axis direction of the electroplated tool.

13. The method for manufacturing an electroplated tool according to claim 10, wherein
the masking process uses a jet dispenser as the application device.

14. A method for manufacturing a screw-shaped grindstone for grinding a gear, the method comprising:
- a masking process for forming a masking on a parent material in a stripe manner in a direction perpendicular to a processing direction; and
- an electroplating process for electroplating abrasive grains on the parent material on which the masking has been formed,
- wherein the masking process causes a width between the adjacent masking to be 150 to 200% of an average particle diameter of the abrasive grains.

15. The method for manufacturing a screw-shaped grindstone for grinding a gear according to claim 14, further comprising:
a first plating process for forming a plating layer on the parent material on which the abrasive grains have been electroplated.

16. The method for manufacturing a screw-shaped grindstone for grinding a gear according to claim 14, further comprising:
- a masking removing process for removing the masking from the parent material on which the abrasive grains have been electroplated; and
- a second plating process for forming a plating layer on the parent material from which the masking has been removed.

17. The method for manufacturing a screw-shaped grindstone for grinding a gear according to claim 14, wherein
the masking process causes a width of the masking to be 100 to 800% of an average particle diameter of the abrasive grains.

18. The method for manufacturing a screw-shaped grindstone for grinding a gear according to claim 14, wherein
the masking process applies, using an application device, a masking agent to form the masking while moving a nozzle of the application device to follow a shape of the parent material such that a distance between a tip of the nozzle of the application device and an application surface of the parent material becomes approximately constant.

19. The method for manufacturing a screw-shaped grindstone for grinding a gear according to claim 18, wherein
the masking process applies the masking agent to form the masking while changing a moving speed of the nozzle or an application dot interval such that the number of application dots per unit distance becomes constant.

20. The method for manufacturing a screw-shaped grindstone for grinding a gear according to claim 18, wherein
the masking process applies the masking agent to form the masking while moving the nozzle in a rotation axis direction of the screw-shaped grindstone for grinding a gear.

21. The method for manufacturing a screw-shaped grindstone for grinding a gear according to claim 18, wherein
the masking process uses a jet dispenser as the application device.

* * * * *